United States Patent [19]
Palone

[11] Patent Number: 5,234,762
[45] Date of Patent: Aug. 10, 1993

[54] COMPLIANT SUPPORT WITH MUTUALLY ADHERED WEB FOR TRANSFER OF INFORMATION

[75] Inventor: Thomas W. Palone, Rochester, N.Y.

[73] Assignee: Eastman Kodak Company, Rochester, N.Y.

[21] Appl. No.: 792,315

[22] Filed: Nov. 14, 1991

[51] Int. Cl.⁵ .............................................. G11B 5/00
[52] U.S. Cl. ........................... 428/336; 428/423.7; 428/694 SL; 428/900; 428/909; 360/136
[58] Field of Search ............... 428/694, 423.1, 423.7, 428/129, 222, 101, 336, 909, 900; 360/136

[56] References Cited
U.S. PATENT DOCUMENTS

| | | | |
|---|---|---|---|
| 2,686,676 | 8/1954 | Rowe et al. | 360/136 |
| 2,709,597 | 5/1955 | Stroobants | 274/40 |
| 2,734,033 | 2/1956 | Menard | 360/136 |
| 2,862,845 | 12/1958 | Szegvari | 360/136 |
| 2,915,357 | 12/1959 | Barkley | 346/74 |
| 2,984,538 | 5/1961 | Kelner et al. | 346/138 |
| 3,682,690 | 8/1972 | Amos et al. | 117/122 |
| 3,747,080 | 7/1973 | Taylor | 340/174 |
| 3,952,133 | 4/1976 | Amos et al. | 428/354 |
| 4,123,784 | 10/1978 | Ichlugi | 360/100 |
| 4,212,436 | 7/1980 | Schoettle | 242/192 |
| 4,504,542 | 3/1985 | Miyoshi et al. | 428/694 |
| 4,633,357 | 12/1986 | Kinjo | 360/87 |
| 4,637,963 | 1/1987 | Nishimatsu et al. | 360/136 |

Primary Examiner—Paul J. Thibodeau
Assistant Examiner—Stevan A. Resan
Attorney, Agent, or Firm—Charles E. Snee, III

[57] ABSTRACT

A duplicating, printing or recording surface is produced by attaching a strip (10) of magnetic or other web material to a support such as a drum (20) or flat support element provided with a layer (22) of low durometer elastomer, the strip of material and the elastomeric material being mutually adherent. With the strip of material wrapped circumferentially around the drum, a sharp knife is used to cut the magnetic material and form a precise butt joint (35,36), diagonal or straight, with a minimal gap. The strip of material forms a secure bond with the low durometer elastomeric layer because of the inherent mutual adherence between the two materials, without the need for an intervening adhesive material. A compliant magnetic drum of this type has a low radial stiffness and a high circumferential stiffness which are well suited for a master recording drum in an anhysteretic duplicating apparatus.

5 Claims, 4 Drawing Sheets

COMPLIANT SUPPORT WITH MUTUALLY ADHERED WEB FOR TRANSFER OF INFORMATION

TECHNICAL FIELD

The present invention concerns methods and apparatus for attaching a length of web material to a compliant surface of a support such as a drum or a planar element, in which the web material embodies information to be transferred, such as by printing, duplicating, magnetic recording or the like. More particularly, the invention relates to a magnetic recording medium suitable for anhysteretic transfer of magnetically encoded information. The invention can also be used in nonmagnetic applications such as printing and duplicating devices having two or three dimensionally featured web material adhered to a compliant surface.

BACKGROUND ART

Various methods are known to attach a material such as a magnetic sheet to a cylindrical drum with the intent of producing a recording surface. U.S. Pat. No. 2,709,597 discloses a recording apparatus in which a rectangular sheet of flexible magnetic web is attached to a compliant rotating drum using hooks and eyelets. The rectangular sheet is then used as a recording surface, yet the sheet can be removed from the drum and replaced with a different sheet for additional recording. U.S. Pat. No. 3,747,080 discloses a recording apparatus in which centrifugal force is used to support a removable strip of magnetic tape on an inner surface of a rotating drum. Since centrifugal force cannot be used to support this removable strip of magnetic tape on the outer surface of the rotating drum, the patent indicates that the medium would have to be adhered the outer surface of the drum by appropriate means, though no specific examples are provided. In U.S. Pat. No. 4,633,357, a recording surface is produced by bending a flexible magnetic film or magnetic sheet into a tubular shape. The end edges of the magnetic film or magnetic sheet are adhered together by applying adhesive tape. The resulting magnetic tube is inserted over a magnetic drum such that when the tube is rotated, it assumes a cylindrical shape which is lightly contacted by a recording head.

While each of the magnetic recording surfaces shown in these patents may be appropriate for its particular application, each patent teaches the use of a separate mechanical element to either secure the web to a drum or other surface, or to secure the ends of the web for use on a drum. The use of mechanical elements results in the need for additional hardware and manufacturing steps. Therefore, a need has existed for a technique to attach a material to a cylindrical drum or other surface without the use of a separate mechanical element. In the case of magnetic recording drums, a need has existed for an attachment between the drum and the recording medium which will provide a rather high circumferential stiffness to keep magnetic information from shifting around the drum; and a rather low radial stiffness to facilitate good contact during anhysteretic recording and to help provide a smooth recording surface.

SUMMARY OF THE INVENTION

The apparatus of the invention comprises a drum with a rigid, central core or other support member. A layer of a low durometer elastomeric material is provided on the exterior surface of the drum or support member. Preferably the elastomeric material is cast onto the drum or support member as a layer having a smooth outer surface. Preferably, the layer of elastomeric material has a Shore A hardness in the range of 10 to 40. A strip of material embodying information to be transferred, such as magnetic recording tape, is wrapped circumferentially around the drum under slight tension or applied to the surface of the layer on the support member. In accordance with the invention, the strip adheres directly to the outer surface of the elastomeric material, without the need for adhesive or other separate mode of attachment. Such mutual adhesion between the strip of material and the elastomeric material is achieved in accordance with the invention by choosing materials for the contacting surfaces which not only have the desired compliance or hardness in the case of the layer of elastomeric material and the necessary characteristics for information transfer in the case of the strip of material, but also have sufficient surface free energy to mutually adhere directly to each other.

In accordance with the method of the invention, to provide a tight, smooth butt joint between the ends of the strip when applied to a drum, a piece of metallic shim stock is placed on the elastomeric layer under the strip in the area where a joint will occur. While maintaining slight tension on the outer end of the strip, a sharp knife is used to make a slice, diagonal or straight, through both thicknesses of the strip over the shim stock. The shim stock and any scraps of magnetic material are then removed and the ends of the strip adhere to the elastomer forming a precise, secure joint with a minimal gap. The secure bond between the elastomeric material and the strip of material is suitable for use in a production environment and ensures that the strip of material remains in contact with the drum. This secure bond attaches the strip of material over the entire circumferential interface with the layer of elastomeric material, thus providing a stable surface with radial compliance and circumferential stiffness at all times. No separate mechanical elements are required to securely attach the magnetic material to the drum.

The low durometer elastomeric material provides the drum with a low radial stiffness, which, for example, improves the interface between the master and slave media in an anhysteretic recording process. The magnetic material has longitudinal stiffness; thus, when the magnetic material is attached to the drum, the resulting compliant magnetic drum has a high circumferential stiffness. In an anhystertic recording process, this high circumferential stiffness stabilizes the magnetic signal timing.

DESCRIPTION OF THE PREFERRED EMBODIMENTS

Figure 1:
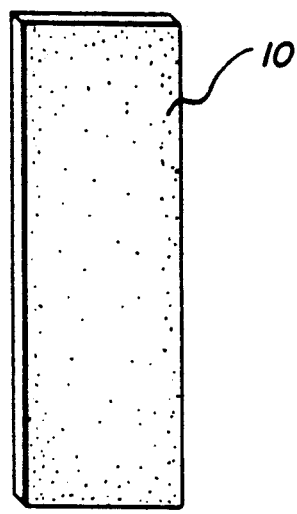
FIG. 1 shows a strip of magnetic material.

The following is a detailed description of the preferred embodiments of the invention, reference being made to the drawings in which the same reference numerals identify the same elements of structure in each of the several Figures.

FIG. 1 shows a strip 10 of a conventional magnetically coated polyester web material. The width and thickness of strip 10 may vary depending on the application, but in one actual embodiment, a 0.0014 inch (0.00356 cm) thick and 0.5 inch (1.27 cm) wide strip was used. The invention is well suited for use in an anhysteretic recording process. In such an application, the coercivity of the magnetic material 10 should be considered. More particularly, if the invention is used as the master drum, the magnetic material 10 should have a high coercivity approximately three times that of the slave medium to which information is to be anhysteretically recorded.

Figure 2:
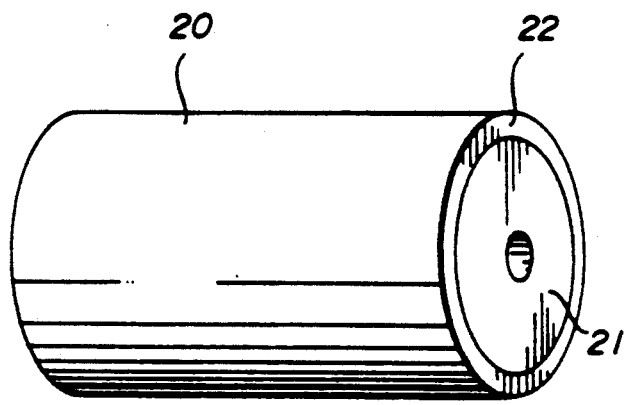
FIG. 2 shows a perspective view of a drum with a rigid, central core and a circumferential elastomeric layer covering the entire circumferential surface of the drum.

FIG. 2 shows a circular cylindrical drum 20 comprising a support member or central core 21 made of rigid material such as stainless steel or aluminum. Although a cylindrical drum is preferred for the support, those skilled in the art will appreciate that a partial cylinder or even a flat support can be used without departing from the spirit and scope of the invention. Surrounding core 21 over its entire axially extending surface is an exterior layer 22 of an elastomeric material having a Shore A hardness in the range of approximately 10 to 40 durometer, preferably 20 to 25 durometer. In the one embodiment, a 0.100 inch (0.254 cm) thick layer of low durometer polyester polyurethane was coated on a stainless steel core approximately 4.0 inches (10.16 cm) in diameter. Layer 22 is preferably applied to central core 21 through a conventional casting process; however, it is also within the scope of the invention to cast layer 22 separately and then adhere or otherwise attach it to core 21. After layer 22 has been applied to central core 21, conventional grinding techniques may be used to produce the desired surface finish and to obtain symmetry around the circumference of drum 20. In one embodiment, the surface of the layer 22 was ground to 16 RMS.

Figure 3:
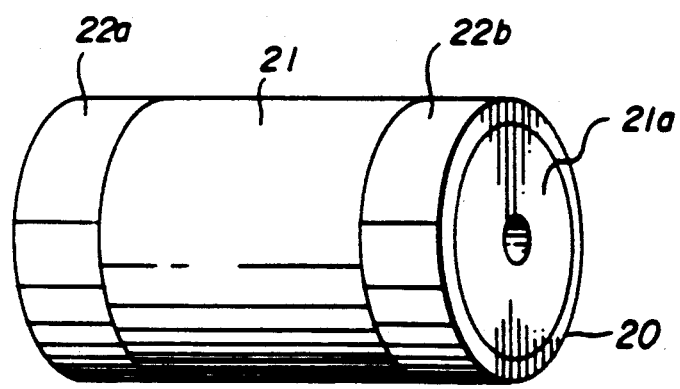
FIGS. 3 and 4, respectively, show a perspective view of an embodiment of the drum in which an annular elastomeric layer is applied at each end of the drum, and a plan view of the central core for such a drum.
Figure 4:
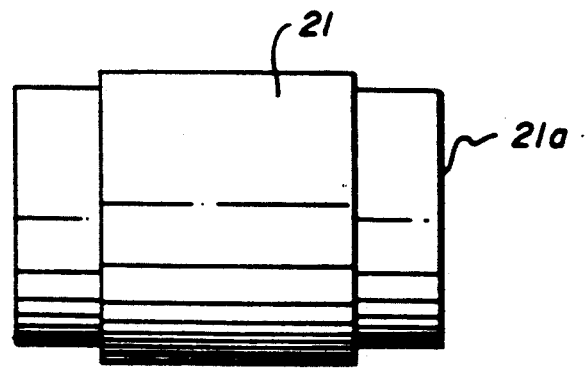

Layer 22 need not be applied over the entire axially extending surface of core 21. Rather, layer 22 only need be applied to the areas where a strip 10 is to be wound on drum 20. However, it is preferred that the exterior surface of layer 22 be smooth and continuous for best support of strip 10. FIG. 3 shows an embodiment in which elastomeric material is cast or otherwise applied in strips 22a, 22b at opposite ends of drum 20. FIG. 4 shows a side view of a central core 21a for the drum of FIG. 3, before strips 22a, 22b have been cast. In this embodiment, elastomeric strips 22a, 22b and central core 21a preferably are ground so that the same diameter exists along the entire length of drum 20.

Figure 5:
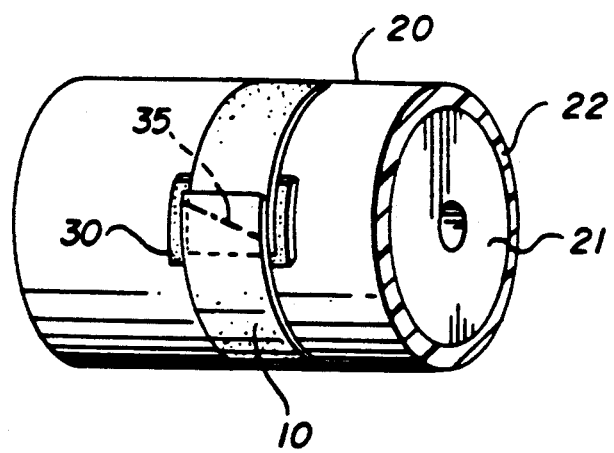
FIG. 5 shows a perspective view of a compliant drum on which a strip of web material has been wound and illustrates a method by which a smooth butt joint can be formed between the ends of the strip.

As shown in FIG. 5, a piece 30 of metallic shim stock may be used as an anvil to cut strip 10 to form a smooth butt joint. Piece 30 is thin stainless steel strip approximately 0.001 inch (0.00254 cm) thick, which provides some flexibility to conform to the curvature of drum 20. Piece 30 is used to support strip 10 as it is cut; therefore, piece 30 needs to be large enough to cover the area over which a desired butt joint will be made. The length and width of strip 10 may vary, though the length of strip 10 should be greater than the circumference of the drum 20 before the butt joint is formed; and the width of strip 10 preferably should be less than the axial length of drum 20.

A first end of strip 10 is placed on layer 22 of drum 20 and wrapped circumferentially around drum 20. A slight tension is applied to provide a smooth, secure fit. An appropriately sized piece 30 is placed on layer 22 under the first end of strip 10 in the area where the second end of strip 10 will overlap and the butt joint will be formed. Since piece 30 is thin and flexible, it conforms to the shape of drum 20, allowing strip 10 to be positioned snugly against the surface of layer 22. While maintaining tension on the second, outer end of strip 10, a sharp knife, not shown, is used to cut through both ends of strip 10 to piece 30. As shown in FIG. 5, a diagonal butt joint 35 may be made. Piece 30 and the waste pieces of strip 10 are then removed and the ends of strip 10 will adhere directly to layer 22 forming a precision butt joint with a minimal gap. The resulting compliant magnetic drum provides a smooth stable surface with radial compliance due to layer 22 and circumferential stiffness due to strip 10. Yet no separate mechanical elements are required to secure strip 10 to layer 22.

Strip 10 and layer 22 are mutually adherent because the inherent surface free energy of the two materials permits the formation a secure bond. Although a good bond has been observed between polyester polyurethane in layer 22 and a polyester base for strip 10, the use of other material couples is within the scope of this invention, where the surface free energies of the two materials are chosen to form such a secure bond; and where the hardness of the elastomeric material for layer 22 falls within the range previously discussed. This type of construction allows renewal of a magnetic surface by removing the present strip of magnetic material and replacing it with a fresh strip of magnetic material. Thus for the anhysteretic recording process, this invention provides the flexibility of quickly evaluating various obtainable magnetic coatings in a compliant drum format.

Figure 6:
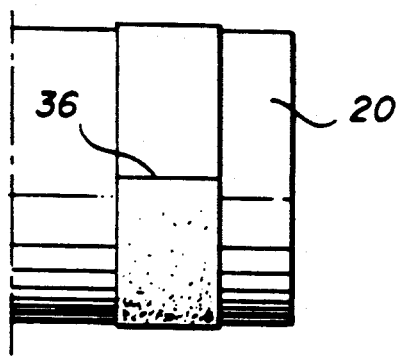
FIG. 6 shows a drum with a strip of material having an axially extending butt joint.
Figure 7:
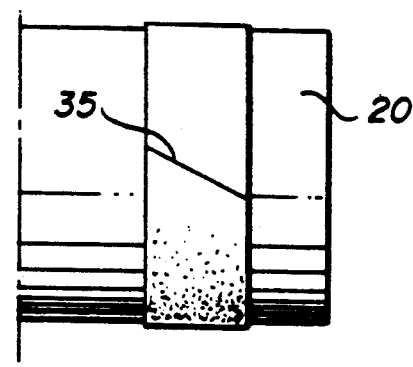
FIG. 7 shows a drum with a strip of material having a diagonally extending butt joint.

The butt joint for strip 10 can be in a diagonal or axial direction. FIGS. 6 and 7 illustrate axial 36 and diagonal 35 joints, respectively, for strip 10 on a compliant magnetic drum 200. As shown, strip 10 is discontinuous at the location of the butt joint. Accordingly, the loss of magnetic data may occur in this region. Therefore it may be desirable to use drum 200 such that less critical or no data is recorded in this region. The geometry of the butt joint may assist in minimizing the loss of magnetic data in this splice region. For example, if the data on drum 200 is read circumferentially, diagonal joint 35 would produce only a partial loss of data at any discrete circumferential position; whereas straight joint 36 would produce a total loss of data at one discrete circumferential position.

Figure 8:
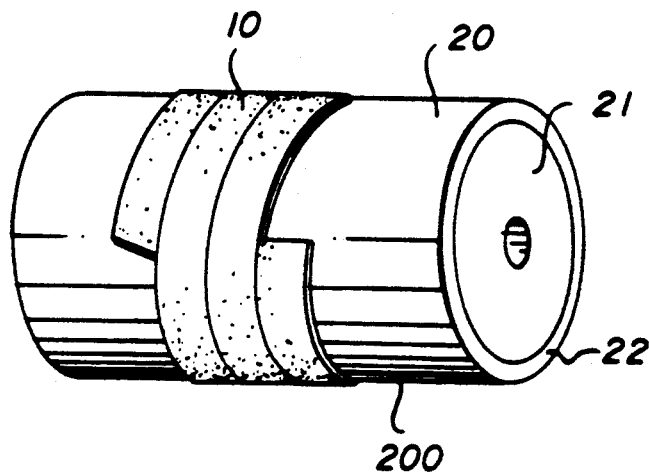
FIG. 8 shows a drum with a strip of material wrapped helically around the drum.

Drum 200 can also be produced by wrapping strip 10 helically around drum 20 with the edges of strip 10 butted together. FIG. 8 shows such a helically wrapped drum 200 where the length of drum 200 is greater than the width of strip 10. Note that drum 200 does not require an end-to-end, axially extending butt joint since the ends of strip 10 do not meet. The edges of strip 10 are butted together to produce a discontinuous magnetic surface with, essentially, a large circumferential diagonal butt joint. The ends of strip 10 may be secured in any convenient manner, not illustrated, preferably axially beyond the area where data is to be recorded.

The strength of the bond formed between the base of strip 10 and elastomeric layer 22 is influenced by the surface finish of layer 22. The strongest bond has been observed on an unground, as cast elastomeric layer 22 having a surface finish preferably less than 8 RMS. By grinding the outer diameter of layer 22, reduced radial runout may be obtained; but the adhesion strength between layer 22 and strip 10 is decreased as the surface of layer 22 is roughened. In one embodiment, the surface of layer 22 was ground to 16 RMS, yet the decreased level of adhesion was found to be quite adequate.

The thickness of strip 10 also affects the bond to layer 22, especially at the butt joint. Thinner materials, approximately 0.0005 to 0.002 inch (0.00127–0.00508 cm) thick have less core set memory associated with circumferential beam stiffness and are therefore less likely to lose contact with layer 22 at the butt joint, compared to thicker materials for strip 10, of approximately 0.0045 inch (0.0114 cm) thickness. Therefore, strips 10 made from such thicker materials may tend to unwrap themselves from layer 22 at the butt joint, especially when strip 10 is applied in the opposite rotational direction of its original core set.

Figure 9:
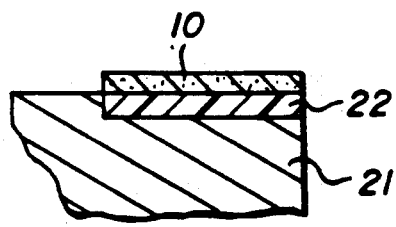
FIGS. 9 to 13 illustrate various cross-sectional geometries for the elastomeric layer which would produce different axially varying patterns of radial stiffness.
Figure 10:
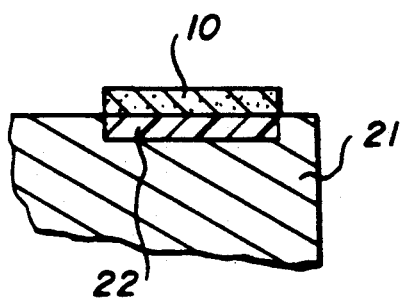
Figure 11:
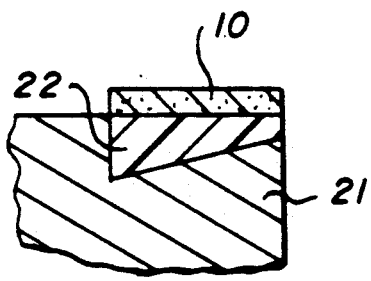
Figure 12:
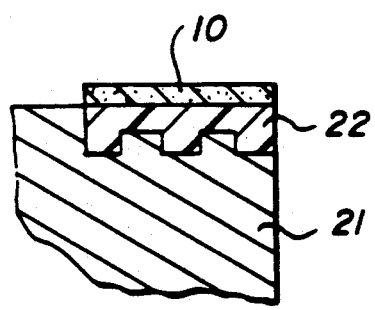
Figure 13:
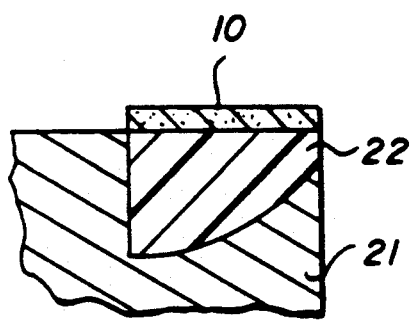

The radial stiffness along the axial length of drum 200 may be controlled by suitable choice of the shape and/or the thickness of layer 22. This may be accomplished by varying the geometry of central core 21 beneath the layer 22. FIGS. 9 to 13 show some examples of possible variations. FIG. 9 illustrates a layer 22 extending to the end of core 21. FIG. 10 illustrates a layer 22 cast into a circumferential groove in core 21. FIGS. 11 and 13 show layers 21 which increase linearly or exponentially in thickness as a function of distance from the end of core 21. FIG. 12 shows a layer 22 whose thickness alternates between radially thicker and thinner sections. Those skilled in the art will appreciate that other geometries for layer 22 can be used without departing from the scope of the present invention. This ability to vary or localize the radial compliance of drum 200 adds a degree of flexibility which can be useful in various recording, printing or duplicating processes.

While it is preferred to use a cylindrical drum to form the recording surface, the recording surface can be shaped differently. For example, a flat support surface could be used for the surface to which layer 22 is applied. Other materials such as Estar, a polyethylene terephthalate material made by the Eastman Kodak Company, and acetate based film material can be chosen which will adhere to an elastomeric layer, forming a secure bond in accordance with the invention.

While the invention is well suited for use as a master drum in an anhysteretic recording process, it can also be used as a duplicating drum in nonmagnetic applications such as various printing and duplicating operations using WEB material with either two or three dimensional features. In such alternative applications, the strip of material applied to the elastomeric layer on the drum would contain information, such as a three-dimensional hologram, that could be duplicated onto another medium. By wrapping the duplicating medium around the master drum, the duplication would occur through physical contact whereby the information on the master drum would be imprinted onto the duplicating medium.

Figure 14:
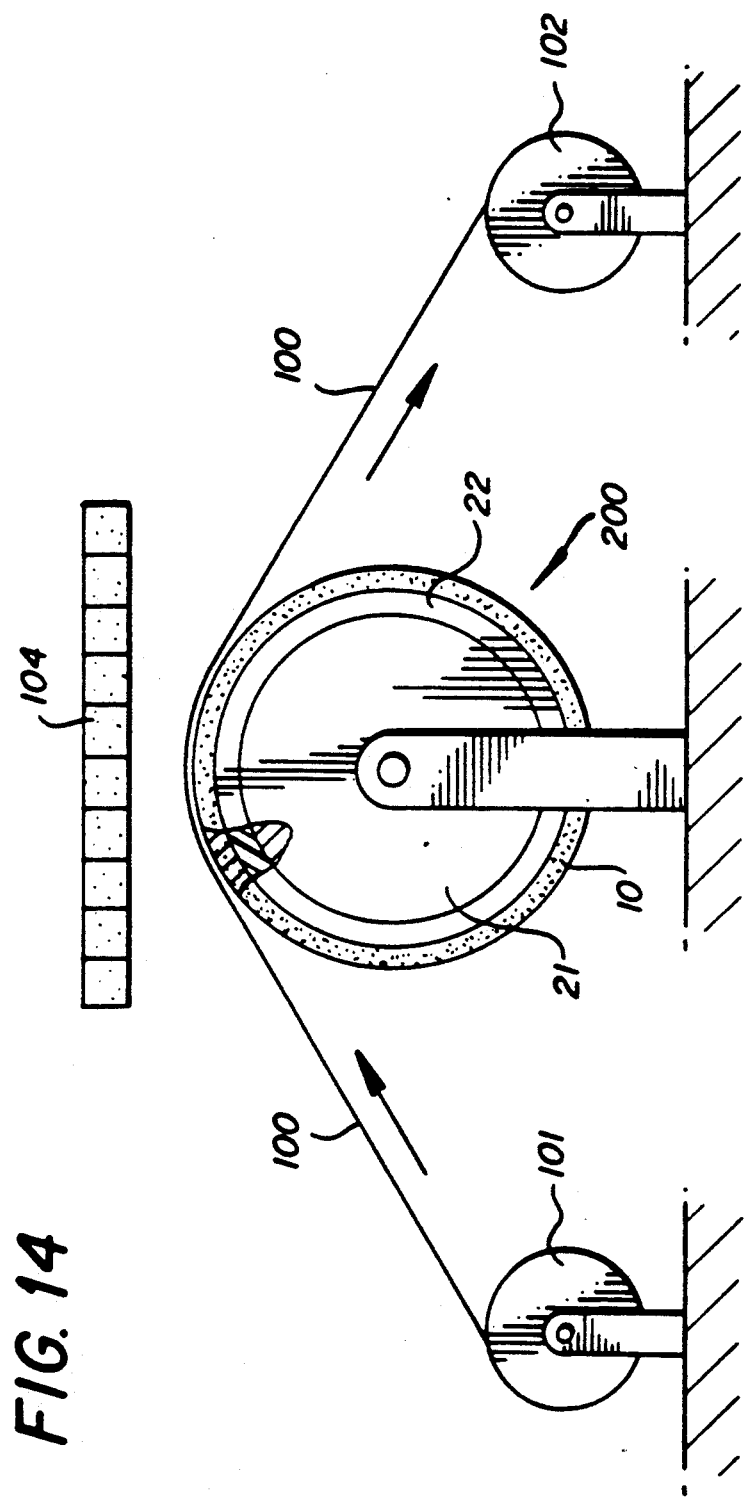
FIG. 14 schematically illustrates the use of the invention in an anhysteretic recording apparatus.

FIG. 14 illustrates one use of the invention as a master recording drum for anhysteretic duplication of magnetic information. The anhysteretic process is conventional and well known to those skilled in the recording art. Strip 10 on drum 200 is provided by conventional recording equipment with the master data to be duplicated onto a slave medium 100. Slave medium 100 is a web of magnetic tape, which has a lower coercivity than that of strip 10 of master recording drum 200. Slave medium 100 is provided from a supply roll 101, is guided without relative slippage over a portion of rotating drum 200 and is wound onto a take-up roll 102. As slave medium 100 contacts master drum 200, it passes through an alternating magnetic field produced by a group of magnets 104 or other bias head, which facilitates transfer of data from drum 200 to slave medium 100. Therefore, when slave medium 100 leaves master drum 200, it carries the same data as that on master drum 200.

The many features and advantages of the present invention are apparent from the detailed specification and thus it is intended by the appended claims to cover all such features and advantages of the present invention which fall within the true spirit and scope of the invention. Further, since numerous modifications and changes will readily occur to those skilled in the art, it is not desired to limit the present invention to the exact construction and operation illustrated and described; and accordingly all suitable modifications and equivalents may be used which will fall within the scope of the present invention.

Having thus described my invention in sufficient detail to enable those skilled in the art to make and use it, I claim as new and desire to secure Letters Patent for:

1. An improved magnetic recording member for transferring information from a length of web material, comprising:
   a support member;
   an exterior layer of elastomeric polyester polyurethane on said support member, said elastomeric polyester polyurethane having a Shore A hardness in the range of 10 to 40 durometer, said layer having an outer surface; and
   a length of magnetically coated polyester web material having a thickness in the range of 0.0005 to 0.002 inches comprising a magnetic layer for transferring said information coated on a polyester layer said polyester layer having an uncoated surface adhered to said elastomeric polyester polyurethane outer surface directly to one another in the absence of an adhesive or other element.

2. An improved magnetic recording member according to claim 1, wherein said recording member is a magnetic recording drum; said support member comprises a circular cylindrical core covered at least in part by said exterior layer; and said length of web material comprises first and second ends, said ends being butted to one another on said first outer surface.

3. An improved recording drum according to claim 2, wherein said ends are butted together parallel to the axis of said core.

4. An improved recording drum according to claim 2, wherein said ends are butted together diagonally to the axis of said core.

5. An improved recording drum according to claim 2, wherein said length of web material is wrapped helically about the axis of said core.

* * * * *